United States Patent
Petrou et al.

(10) Patent No.: US 9,424,668 B1
(45) Date of Patent: Aug. 23, 2016

(54) SESSION-BASED CHARACTER RECOGNITION FOR DOCUMENT RECONSTRUCTION

(71) Applicant: GOOGLE INC., Mountain View, CA (US)

(72) Inventors: David Petrou, Brooklyn, NY (US); Krishnendu Chaudhury, Saratoga, CA (US); Sergiu Goschin, New York, NY (US); Matthew John Bridges, New Providence, NJ (US)

(73) Assignee: Google Inc., Mountain View, CA (US)

( * ) Notice: Subject to any disclaimer, the term of this patent is extended or adjusted under 35 U.S.C. 154(b) by 51 days.

(21) Appl. No.: 14/532,692

(22) Filed: Nov. 4, 2014

Related U.S. Application Data

(60) Provisional application No. 62/043,176, filed on Aug. 28, 2014.

(51) Int. Cl.
  *G06T 11/20* (2006.01)
  *G06T 11/60* (2006.01)

(52) U.S. Cl.
  CPC ............... *G06T 11/206* (2013.01); *G06T 11/60* (2013.01)

(58) Field of Classification Search
  CPC ... G06Q 50/01; G06K 2209/01; G06K 9/469; G06K 9/00442; G06K 9/00449; G06K 9/00483; G06K 9/342; G06K 9/46; G06K 9/6224; H04L 67/18; H04L 67/22; G06F 17/30554; G06F 17/30899
  See application file for complete search history.

(56) References Cited

U.S. PATENT DOCUMENTS

| | | | |
|---|---|---|---|
| 5,774,579 A * | 6/1998 | Wang | G06K 9/00442 382/176 |
| 7,840,033 B2 | 11/2010 | Kurzweil et al. | |
| 8,509,566 B2 | 8/2013 | Jin et al. | |
| 2001/0016063 A1 | 8/2001 | Albeck et al. | |
| 2007/0041642 A1 | 2/2007 | Romanoff et al. | |
| 2008/0253685 A1 | 10/2008 | Kuranov et al. | |
| 2012/0134591 A1* | 5/2012 | Kimura | G06K 9/342 382/185 |
| 2013/0044959 A1* | 2/2013 | Mitchell | G06Q 30/02 382/217 |

OTHER PUBLICATIONS

Hsu, et al. "Snap2Read: Automatic Magazine Capturing and Analysis for Adaptive Mobile Reading", Advances in Multimedia Modeling, Lecture Notes in Computer Science, vol. 6524, 2011, 11 pages.
Nandhini, et al, "Analysis on Feature Detection for Image Mosaicing", International Journal of Application or Innovation in Engineering & Management (IJAIEM), vol. 1, Issue 2, Oct. 2012, 4 pages.

* cited by examiner

*Primary Examiner* — Maurice L McDowell, Jr.
*Assistant Examiner* — Raffi Isanians
(74) *Attorney, Agent, or Firm* — Brake Hughes Bellermann LLP

(57) ABSTRACT

Systems and methods are provided for sharing a screen from a mobile device. For example, a method includes receiving an image from a mobile device, performing recognition on the image to identify space-delimited strings, and generating a content graph for the image, the content graph having content nodes that represent at least some of the strings and the content graph having edges that represent a relative position of strings associated with the content nodes connected by the edges. The method may also include repeating the receiving, performing recognition, and generating for a plurality of images, the plurality of images belonging to a session, and generating a combined graph from the plurality of content graphs based on similarity of content nodes between content graphs, the combined graph representing text from the plurality of images in reading order.

20 Claims, 8 Drawing Sheets

FIG. 2

Fifteen ways to change the world: 2014 Google Science Fair

Kenneth Shinozuka from New York City, wants to help people with Alzheimer's disease, like his grandfather. Kenneth developed a small, wearable sensor to be worn on his grandfather's foot. When pressure is applied to the sensor, it alerts his family via a mobile app, which allows them to monitor when his grandfather is on the move. By monitoring this behavior, Kenneth hopes to understand the causes of wandering brought on by Alzheimer's, and to ultimately find a way to mitigate or prevent it.

Samuel Burrow, from the U.K., wants to improve the environment by reducing pollution. Taking inspiration from the chemical used in sunscreen, Samuel created a special coating that reduces waste chemicals in the air when subjected to ambient light. And Cynthia Sin Nga Lam, from Australia, thinks everyone deserves access to clean water and created an eco-friendly and economical device to do just that.

These are just a few examples of the 15 incredible projects we've named as the global finalists for 2014 Google Science Fair. This is our fourth time hosting the competition as a way to encourage the next generation of scientists and engineers. From Russia to Australia, India to Canada, this year's finalists (ages 13-18) are already well on their way to greatness. See all 15 projects on the Google Science Fair website.

Special recognition also goes to Kenneth, who has also been awarded the Scientific American Science In Action Award. The prize celebrates a project that addresses a health, resource or environmental challenge, and comes with a year's

---

205: Kenneth Shinozuka from New York City, wants to help people with Alzheimer's disease, like his grandfather. Kennet

210: inozuka, ork City, lp people mer's e his Kenneth small / These are just the 15 incredib named as the 2014 Google S our fourth time competition as the next gener

215: just a few examples of edible projects we've the global finalists for gle Science Fair. This is time hosting the n as a way to encourage eneration of scientists

SESSION-BASED CHARACTER RECOGNITION FOR DOCUMENT RECONSTRUCTION

REFERENCE TO RELATED APPLICATION

This application is a non-provisional of, and claims priority to, U.S. Provisional Application Ser. No. 62/043,176, filed Aug. 28, 2014, which is incorporated by reference herein in its entirety.

BACKGROUND

Character recognition is a form of recognition used to identify text in an image. Character recognition can be used, for example, to determine what text occurs in a screen capture image so that this information can be used to personalize, improve, and streamline the user experience on a mobile device. Character recognition can also be used in scanning a hard-copy document into a computing device, for example for electronic editing. But character recognition is noisy, meaning that some words or characters are misread, with errors increasing as the font size decreases. This problem is exacerbated by the limited screen area and camera field of view on a mobile device, which make it difficult to display, in a readable manner, the entirety of a source document on the screen. Thus, a document displayed on a mobile device often has text too small for successful recognition or must be displayed a section at a time, resulting in the loss of context provided by the full document.

SUMMARY

Implementations include a graph-based approach to reconstructing text in reading order from multiple images. Implementations use a session-based approach to capture multiple images, performing recognition on each image and generating a content graph for each image. A content graph includes a node for each space-delimited string of characters (e.g., each word) recognized in the image. The content graph can also include a node for each feature point identified in the image. An edge in the content graph represents a relative position or relative location in the image of the two words or features represented by the two nodes the edge connects. The relative position is not dependent on the size of the font in the image. Thus, if a user zooms in on the source document during the session, the relative position of two words identified in the pre-zoom image and the post-zoom image stays the same even when the white space between the words increases. In some implementations, the nodes in the content graph may include metadata or attributes, such as image coordinates, bounding box size and location, etc.

Once a session is complete, the system stitches the content graphs generated for the images included in the session together to generate a combined graph. The combined graph may be generated using graph isomorphism techniques, which identify and combine common nodes between two separate graphs. For example, the system may cluster nodes between content graphs based on string similarity, edge similarity, bounding box similarity, etc. A cluster may represent a node in the combined graph and may have one content node, a content node from each of the content graphs, or any quantity in between. The system may select a cluster label from the best string in the cluster. The best string may be determined by voting or by other techniques. The combined graph represents a stitching of the text of the various images in the session in reading order, and can thus be traversed in reading order. This text, in reading order, can be used as input for various purposes, such as editing the text, disambiguating entities identified in the text, determining an image shift between two of the images in the session, etc. In some implementations, the system may generate multiple combined content graphs for the images included in the session, each combined graph generated using different heuristics. For example, if the language of the images is not known a priori, the system may use heuristics for different languages and rank the generated combined graphs, selecting the one with the best rank.

According to an aspect of the disclosure, a mobile device includes at least one processor and memory storing instructions that, when executed by the at least one processor, cause the mobile device to perform operations. The operations can include, for a plurality of images associated with a session, performing recognition on the image to identify space-delimited strings and generating a content graph for the image, the content graph having content nodes that represent at least some of the strings, an edge in the graph representing a relative position of the content nodes the edge connects. The operations may also include generating a combined graph from the plurality of content graphs based on similarity of content nodes between content graphs, wherein the combined graph represents text from the plurality of images in reading order.

According to one aspect of the disclosure, a method includes receiving an image from a mobile device, performing recognition on the image to identify space-delimited strings, and generating a content graph for the image, the content graph having content nodes that represent at least some of the strings and the content graph having edges that represent a relative position of strings associated with the content nodes connected by the edges. The method may also include repeating the receiving, performing recognition, and generating for a plurality of images, the plurality of images belonging to a session, and generating a combined graph from the plurality of content graphs based on similarity of content nodes between content graphs, the combined graph representing text from the plurality of images in reading order.

According to one aspect of the invention, a system includes at least one processor and memory storing instructions that, when executed by the at least one processor, cause the system to perform operations. The operations may include, for each of a plurality of images associated with a session: performing recognition on the image to identify space-delimited strings and generating a content graph for the image, the content graph having content nodes that represent at least some of the strings, wherein an edge in the graph represents a relative position of the content nodes the edge connects. The operations may also include generating a combined graph from the plurality of content graphs by clustering the content nodes and disambiguating an entity mention in one of the plurality of images based on context derived from the combined graph. In some implementations, the operations may also include, for a cluster, selecting a content node from the cluster as a label for the cluster, wherein the cluster label is used as context for disambiguating the entity.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for stitching together text captured by multiple images during a session in reading order and improving character recognition results.

One or more of the implementations of the subject matter described herein can be implemented so as to realize one or more of the following advantages. As one example, images do not need to be captured in any particular order during a session to reconstruct the source document because the combined graph uses similarity of relative positions to stitch together content graphs. As another example, the combined graph can be used to reduce noise introduced by character recognition or to reduce transient noise external to character recognition, such as camera focusing issues, obstructions, especially when several images in the session have large overlapping areas. Noise reduction results from the ability of each image to vote for a best interpretation of a word, but the images need not include the same content (e.g., noise reduction works even if the user is scrolling). As another example, implementations can determine a positional relationship between any two overlapping images, which can be useful in determining how the display has shifted. As another example, the system may be able to recognize and stitch together scrolling text, such as headlines scrolling across the bottom of a screen.

The details of one or more implementations are set forth in the accompanying drawings and the description below. Other features will be apparent from the description and drawings, and from the claims.

BRIEF DESCRIPTION OF DRAWINGS

FIG. 2 illustrates a source document and multiple images of the source document, in accordance with the disclosed subject matter.

Like reference symbols in the various drawings indicate like elements.

DETAILED DESCRIPTION

Figure 1:
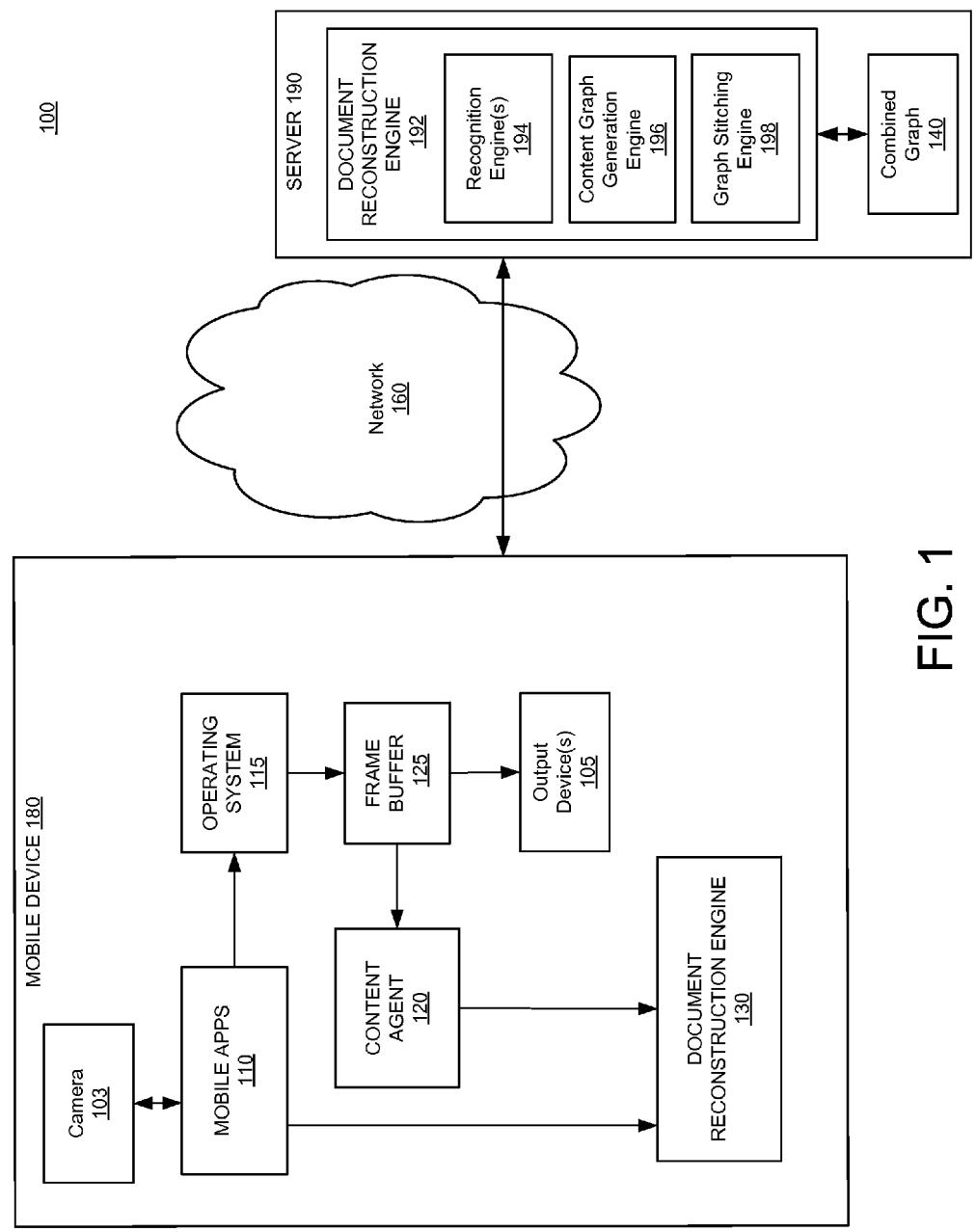
FIG. 1 is a block diagram illustrating an example system in accordance with the disclosed subject matter.

FIG. 1 is a block diagram of a document reconstruction system 100 in accordance with an example implementation. The system 100 may be used to reconstruct text identified in multiple overlapping images of a source document in reading order. A source document may be a physical page being scanned or may be an electronic document displayed on a screen or series of screens. For example, a user reading an electronic document, such as an article, an email, search results, etc., on a mobile device must often navigate, or scroll left, right, up, down, to view the entirety of the source document. Thus, any scrollable content displayed on a mobile device may be considered a document and, as the user reads the document, the mobile device may capture the screen, with each screen capture image representing a portion of the source document. Thus, a user navigating through content on a mobile device is similar to a user scanning portions of a physical document. The text captured from the source document may be used in various ways, such as to provide context for various forms of user assistance on a mobile device, to provide a consistent user experience across mobile applications, to edit or store the text, etc. In addition, the system 100 may be used to reduce recognition noise by, for example, taking multiple images of a source document and using the multiple images as votes for an interpretation of a string of characters. The system 100 in FIG. 1 is a client-server system, with some data processing occurring at a server 190. However, other configurations and applications may be used. For example, the data processing may occur exclusively on the mobile device 180. Furthermore, in some implementations some of the processing may be done on the mobile device 180 and some of the processing may occur on the server 190. In some implementations, a user of the mobile device 180 may indicate that portions of the processing be performed at the server 190. While one client is illustrated in FIG. 1, it is also understood that multiple clients may use server 190. Thus, implementations are not limited to the exact configurations illustrated.

Figure 7:
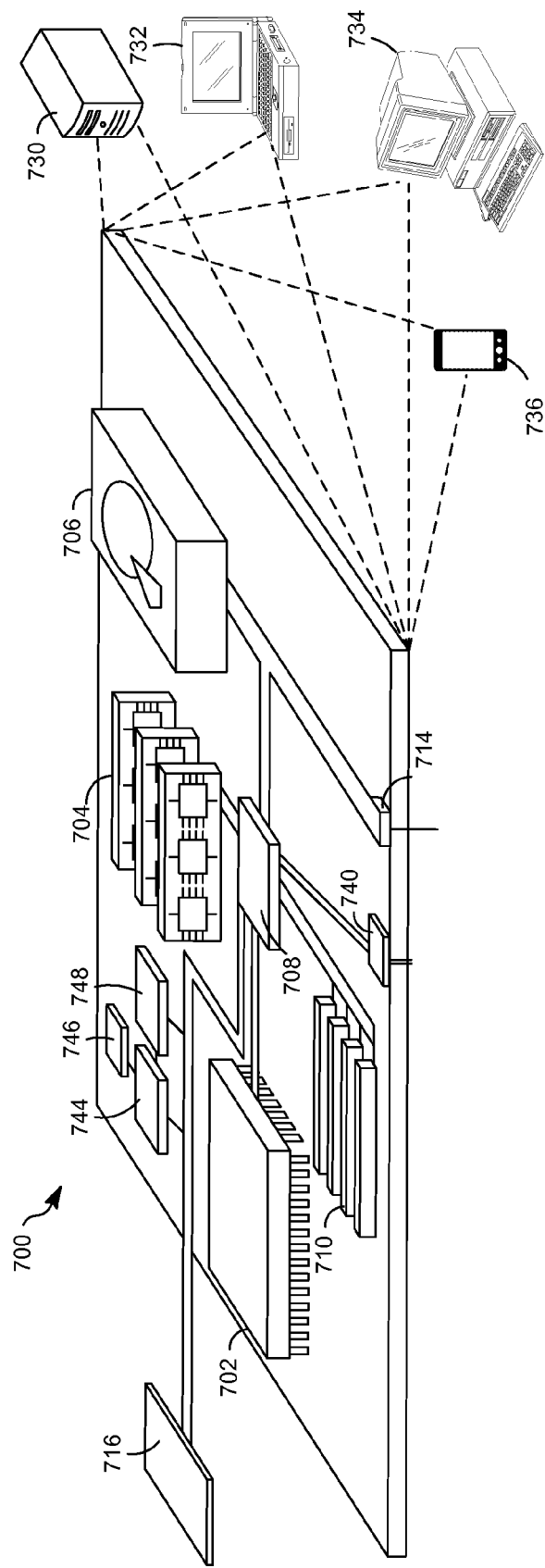
FIG. 7 shows an example of a computer device that can be used to implement the described techniques.
Figure 8:
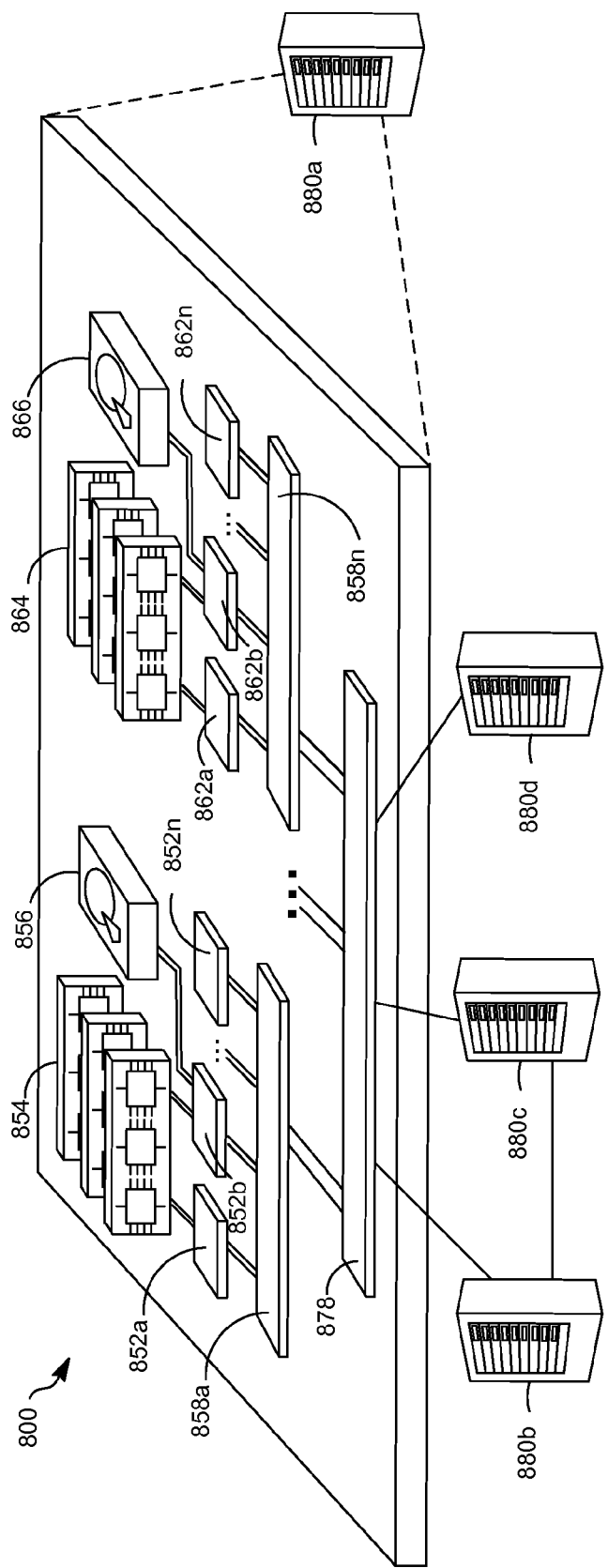
FIG. 8 shows an example of a distributed computer device that can be used to implement the described techniques.

The document reconstruction system 100 may include a server 190, which may be a computing device or devices that take the form of a number of different devices, for example a standard server, a group of such servers, or a rack server system. For example, server 190 may be implemented in a distributed manner across multiple computing devices. In addition, server 190 may be implemented in a personal computer, for example a laptop computer. The server 190 may be an example of computer device 700, as depicted in FIG. 7, or computer device 800, as depicted in FIG. 8. Server 190 may include one or more processors formed in a substrate configured to execute one or more machine executable instructions or pieces of software, firmware, or a combination thereof. The server 190 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules that, when executed by the one or more processors, perform certain operations. In some implementations, the modules may be stored in an external storage device and loaded into the memory of server 190.

The document reconstruction system 100 may include a document reconstruction engine 192. The document reconstruction engine 192 may include components that analyze images, e.g., from a camera or scanning device or screenshots, taken on a mobile device to identify strings and feature points, to generate a content graph for each image, and to stitch the content graphs together to generate text in reading order from the combined graph. As illustrated in FIG. 1, components of the document reconstruction engine 192 may be executed by server 190. In some implementations, one or more components of the document reconstruction engine 192 may be executed as a mobile application on mobile device 180, for example as document reconstruction engine 130. Such components may be executed either as part of the operating system or a separate mobile application.

The document reconstruction engine 192, or the document reconstruction engine 130, includes a recognition engine 194. The recognition engine 194 may be configured to perform various types of recognition on an image, including character recognition, image recognition, logo recognition, etc., using conventional or later developed techniques. Thus, recognition engine 194 may be configured to determine characters, landmarks, logos, etc. from an image and the location of these items in the image. The recognition engine 194 may include a character recognition process that identifies strings of characters delimited by whitespace. In general, such strings may also be referred to as words, although the string may not correspond to a word found in a dictionary. This may be due to recognition error or due to a complete word being cut off or split in a particular image. As used herein, strings and words may be used interchangeably and do not necessarily correspond to a dictionary-defined word. As indicated above, the recognition engine 194 may also recognize landmarks, logos, and other non-textual entities. Landmarks and logos, as well as other non-textual elements, such as faces, may be considered feature points. A feature point is any distinctive area of an image that stands apart from the surrounding elements of the image. Feature points may or may not include text themselves, such as a person wearing a t-shirt with a slogan, and may or may not represent entities.

The document reconstruction engine 192 (or 130) may also include a content graph generation engine 196. The content graph generation engine 196 may take the output from the recognition engine 194 and generate a content graph for the image. A content graph has the identified strings (e.g., the words) as nodes. In some implementations, if a confidence level for a string does not meet a threshold the content graph generation engine 196 may not include a node for that string. The content graph generation engine 196 may generate edges between nodes in the content graph. An edge in the content graph represents a relative position in the image between the two words represented by the two nodes the edge connects. The relative position may be an indication of direction. For example, in some implementations, the relative position may indicate "to the right, "to the left", "above" or "below". In some implementations, for a particular node associated with a particular word, the graph may include edges that connect the particular node to any other node that corresponds with a word in the line above, the line below, to the left, or to the right of the particular word. In some implementations, the relative position may indicate immediately above, above and to the right, etc. In some implementations, a particular node may be connected to more than just nodes associated with words in the line of text immediately above the word associated with the particular node. For example the relative position may include an indication of how many lines above. Similarly, the relative position may include an indication of how many words to the right or left.

In some implementations, a particular node may be connected to nodes of words that surround the word represented by the particular node. For example, the system may use a bounding box to determine which other words have a bounding box that overlaps with the bounding box of a word represented by the particular node. A bounding box for a word is an area of the image that encompasses the word. A bounding box, in general, is not limited to encompassing a word, but may encompass multiple words or feature points in the image. The bounding box may be defined by a location and dimension, and need not be rectangular and may not be aligned with a horizontal and vertical axis. As one non-limiting example, a bounding box may be defined by coordinates for an upper right corner and a lower left corner. Each individual word and feature point may have a bounding box, and collections of these items may also have a bounding box. For example, a paragraph may have a bounding box, a column, including paragraphs and pictures, may have a bounding box, etc. In some implementations, a node in the content graph may include an indication of the bounding boxes it belongs to. In some implementations, the content graph may include a bounding box node. A bounding box node may have edges linking the bounding box node with content nodes or feature point nodes that are encompassed by the bounding box.

In some implementations, the system may store the content graph for an image, at least until the session closes or until the image expires. For example, if the system uses a rolling session, so that an image may be included in more than one session, the system may generate the content graph for the image one time and store it until the image is old enough not to be included in a session.

The document reconstruction engine 192 (or 130) may include a graph stitching engine 198. The graph stitching engine 198 may take the content graphs for multiple images and combine them, based on node similarities. The multiple images may be for a session. A session may be defined as a period of time, a number of images, or may be expressly defined by a user. For example, if the user is scanning in a physical document, the user may expressly begin the session and end the session. In other implementations, the session may be defined as a fixed period of time. For example, the mobile device 180 may have a content agent running that, with user consent, captures the screen of the mobile device at intervals, as will be explained in more detail below. The session may be defined as a period of time, perhaps a few seconds, and any screen capture images captured during that period of time may be considered in the session. Accordingly, individual sessions may overlap, or one session may begin following the close of the previous session. In some implementations, a session may be defined by a quantity of images. For example, if the content agent captures a screen at a slower rate when the user is not scrolling and more frequently when the user is scrolling or otherwise interacting with the screen, the session may be defined by a quantity of images rather than a specific time period. Of course, a session may also be defined in terms of the mobile application that generates the content displayed on the screen, so that if the user switches from one mobile application to another, a session may be ended early.

The graph stitching engine 198 may combine the content graphs of the images in a session to generate a combined graph 140. The combined graph 140 may be generated using principles of graph isomorphism, which find and combine common nodes between two separate graphs. For example, the graph stitching engine 198 may cluster nodes between content graphs based on string similarity, edge similarity, bounding box similarity, etc. A cluster may represent a node in the combined graph 140. A cluster may have one content node from one content graph, a content node from each content graph of the images in the session, or any number in between. The label or string for a cluster may be selected based on the confidence levels and similarity of the content nodes that belong to the cluster. For example, if two content nodes are in a cluster, one associated with a string having a lower recognition confidence level than the string associated with the other node, the system may select the string with the higher confidence level for the cluster. A recognition confidence level is an indication of how confident the character recognition process is that particular characters or words have been correctly recognized. If there are more than three content nodes in the cluster, the system may use a voting process, where each content node's associated string is a vote for the cluster label, and the string with the highest vote wins. The system may also use edit distances between the strings to select a label for the cluster, as explained below with regard to FIG. 6. When there is significant overlap in the images, selecting a best string may reduce noise generated by the recognition process. Thus, for example, if four content nodes are associated with the string "to" and one content node is associated with the string "t0" the system may conclude the best string for the cluster label is "to." Thus, the reconstructed text from the combined graph includes "to" and not "t0." It is understood that although combined graph 140 is illustrated as being stored at the server 190, in some implementations the server may transmit the combined graph 140 to the mobile device 180 for further processing. In some implementations, the document reconstruction engine 130 includes the graph stitching engine 198 and generates combined graph 140 at the mobile device 180 so that no transmission is necessary.

The combined graph 140 may be traversed in reading order. For example, some bounding boxes may indicate columns, and the text in the first column may be read before the text in the second column. Furthermore, for a language read left-to-right, the node associated with the word in the upper left-most portion of the column bounding box may be read first, followed by the node to the immediate right, etc. In some implementations, the graph stitching engine 198 may traverse the combined graph 140 to generate and store reconstructed document text. In other words, traversing the combined graph 140 in reading order reconstructs the text of a source document that does not fit within one image. In some implementations, the combined graph 140 may be provided for additional processing, such as entity disambiguation, content analysis, generation of annotation data to improve the user experience, indexing, etc.

The document reconstruction system 100 may also include mobile device 180. Mobile device 180 may be any mobile personal computing device, such as a smartphone or other handheld computing device, a tablet, a wearable computing device, etc., that operates in a closed mobile environment rather than a conventional open web-based environment. Mobile device 180 may be an example of computer device 700, as depicted in FIG. 7. Although FIG. 1 illustrates a mobile device 180, it is understood that some implementations may use a personal computer or laptop. Mobile device 180 may include one or more processors formed in a substrate configured to execute one or more machine executable instructions or pieces of software, firmware, or a combination thereof. The mobile device 180 may include an operating system 115 and one or more computer memories configured to store one or more pieces of data, either temporarily, permanently, semi-permanently, or a combination thereof. The mobile device 180 may thus include applications, including mobile applications 110, content agent 120, and document reconstruction engine 130, which represent machine executable instructions in the form of software, firmware, or a combination thereof.

Conventionally, mobile applications, such as mobile applications 110, operate in a closed environment, meaning that the user employs separate applications to perform activities conventionally performed in a web-based browser environment. For example, rather than going to hotels.com to book a hotel or opentable.com to make a reservation, a user of the mobile device 180 can use a mobile application provided by hotels.com or opentable.com respectively. One of the mobile applications 110 may be an application that scans a physical document using, for example a camera 103, and converts the scanned document to text. Thus one of the mobile applications 110 may send multiple images captured using the camera 103 directly to the document reconstruction engine 130. Of course, in some implementations, the mobile application may send the images to a document reconstruction engine 192 on a server 190. In some implementations, the document reconstruction engine 130 on the mobile device 180 may include an interface that transmits the images to the document reconstruction engine 192 on the server 190. The mobile device 180 may also include one or more output devices 105. The output devices may include a display device for displaying visual content and speakers for presenting audio content.

The mobile device 180 may include content agent 120. The content agent 120 may be configured to capture the current screen, e.g. by copying or reading the contents of the mobile device's frame buffer. It is understood that the mobile device 180 provides visual content and audio content in the form of data. The data in the frame buffer thus represents objects understood by a mobile application and the user, such as text, pictures, icons, logos, etc. Thus, as used herein content may be understood to be the data in the frame buffer and the objects they represent to the user or the mobile application. The content agent 120 may capture the current screen at intervals or upon interaction of the user with the screen of the mobile device 180. For example, the user may perform an action, such as a swipe up, a swipe down, a diagonal swipe, a two-finger swipe, etc., that initiates a screen capture by the content agent 120. Alternatively, the content agent 120 may capture the screen at some interval, perhaps a small interval, such as every half second or every second. The content agent 120 may provide captured screens and may provide metadata to a document reconstruction engine, such as document reconstruction engine 130 or document reconstruction engine 192. The metadata may include a timestamp, a mobile device type, a location of the mobile device, a mobile device identifier, the mobile application running when the screen was captured, or in other words the application that generated the screen content, any restrictions for the screen content, and other device information, such as which applications were active, ambient light, motion of the device, etc. The restrictions may restrict certain uses of the recognized content, such as sharing or indexing, or may restrict any uses before or after a certain time. Other metadata may assist in further processing (e.g., entity disambiguation, ranking search results) and deciding what key values extracted from the data in the frame buffer are most relevant to the user of the mobile device.

The user of the mobile device 180 may control when the content agent 120 is active. For example, the user may specify that the content agent 120 is active only when other specified mobile applications 110 are running (e.g., only when running a social media mobile application). The user may also manually turn the content agent 120 on and off, for example via a settings application.

The system 100 may also include various other engines or applications (not shown) that perform further processing using the combined graph 140. For example, the system 100 may also include an entity identification engine that matches items identified by the recognition engine 194 in one captured screen image to entities in a data graph. When an item matches more than one entity in the data graph, the system 100 may use the combined graph 140 as context to disambiguate the entity. For example, if the system identifies the text "Jaguar," this may match three entities in the data graph: one representing an animal, one representing an NFL team, and the third representing a car. The system may use the combined graph 140 from a session that includes the image to determine context to help select the correct entity, e.g., to disambiguate the entity. For example, if the combined graph mentions other auto-related words, the system may have a high confidence that the mention refers to the car entity. Because the number of words in any particular image can be small, e.g., due to limitations of screen size, such context may only be available in another image in the session.

In a system 100 that includes an entity identification engine, the system 100 may also include the data graph. The data graph may be a large graph-based data store that stores data and rules that describe knowledge about the data in a form that provides for deductive reasoning. For example, in a data graph, information may be stored about entities in the form of relationships to other entities and properties or attributes about an entity. An entity, by way of non-limiting example, may include a person, place, item, idea, topic, word, phrase, abstract concept, concrete element, other suitable thing, or any combination of these. Entities may be related to each other by labeled edges that represent relationships. The labeled edges may be directed or undirected. For example, the entity representing the National Football League may be related to a Jaguar entity by a "has team" relationship. A data graph with a large number of entities and even a limited number of relationships may have billions of connections. In some implementations, data graph may be stored in an external storage device accessible from server 190 and/or mobile device 180. In some implementations, the data graph may be distributed across multiple storage devices and/or multiple computing devices, for example multiple servers. The entities, attributes, and relationships in the data graph may be searchable, e.g., via an entity index. For example, the entity index may include text by which an entity has been referred to. Thus, reference to the data graph may be understood to include an entity index that facilitates finding an entity using a text equivalent.

The system 100 may also include an indexing engine that indexes a screen capture image according to the text, entities, images, logos, etc. identified in the image. Thus, for example, the indexing engine may generate index entries for an image. The index may be an inverted index, where a key value (e.g., word, phrase, entity, image, logo, etc.) is associated with a list of images that include the key value. The index may include metadata (e.g., where on the image the key value occurs, a rank for the key value for the image, etc.) associated with each image in the list. In some implementations, the index may also include a list of images indexed by a timestamp. The indexing engine may use one or more combined graphs to determine the key values, e.g., words or phrases and entities, identified in an image, because the combined graph can reduce noise and produce more accurate key values for the screen capture index. The system 100 may also include a query engine that uses the screen capture index to respond to queries and may return one or more of the screen capture images as a search result.

The system 100 may include an annotation engine that generates annotation information designed to be integrated with particular content displayed on the screen of the mobile device. The annotation information may be an overlay displayed on top of the screen being displayed, an underlay displayed behind the screen being displayed, or information configured to be added to the current screen in the display buffer of the mobile device. In other words, the annotation information represents information added to a screen generated by a mobile application at the mobile device, whether displayed over, under, or integrated into the screen when it is displayed. Annotation data may add areas of actionable content to the screen by identifying text or pictures that are associated with one or more default actions and generating an actionable visual cue for the identified text or pictures. For example, the annotation data may generate a visual cue for a phone number that, when selected, initiates a phone call. The visual cue thus, acts like a hyperlink in an HTML-based document. Because the document reconstruction system 100 can provide the annotation data for any mobile application running on the mobile device, actions are consistent across mobile applications.

The annotation data may also annotate content that is important or relevant to the user of the mobile device. Content may be important or relevant because it summarizes a body of text or because it ranks highly with regard to user preferences. For example, the annotation data may highlight a list entry that includes an entity of particular interest to the user or highlight text that summarizes a paragraph. This type of annotation data may enable a user to more quickly notice a relevant item in a list of items displayed on the screen of the mobile device or draw the user's attention to the summary, allowing the user to more quickly identify the main point of a body of text.

These are just two examples of annotation data that the system 100 may generate annotation data for underlying content. The content agent 120 may use annotation data to integrate the additional information provided in annotation data with a current screen. In some implementations, the system 100 may use the combined graph 140 to determine an image shift to correctly align the annotation data with the underlying content currently displayed on the mobile device. For example, if annotation data was generated for a first screen capture image and a second screen capture image is currently displayed on the mobile device, the system can generate a combined graph from content graphs for the first and second images. Any common nodes in the combined graph may provide data used to calculate an image shift between the first image and the second image. For example, a node in the combined graph may correspond to a first content node and a second content node. The difference in coordinates for the first content node and the second content node may be used to determine image shift. The system 100 may apply the image shift to the annotation data, so that the visual cues in the annotation data align with corresponding underlying content. In another example, a visual cue in the annotation data may be associated with one or more content nodes of the content graph for the first image. The combined graph may provide an indication of a corresponding content node in the second image, and the geographic information for the second content node may be used to display the visual cue. As another example, the two images may include a reference feature. A reference feature is a word or picture that has a known absolute position in a document. For example, a newspaper title or footer. The system can recognize such elements in successive images and use the known absolute position to calculate image shift. For example, if the first image includes a newspaper title and the next image includes the footer, the system can, knowing the size of the newspaper, calculate the image shift even when nodes do not overlap.

The system 100 may include an image stitching engine that uses the combined graph to align at least some of the images in the session. For example, the image stitching engine may determine an image shift between two images and align the two images according to the image shift. The system may continue to determine an image shift between the first and/or the second of the two images and a third image, and align the third image with the two images according to the image shift. Thus, the image shift can be used not only to align annotation data but also to stitch together multiple overlapping images from the session.

The document reconstruction system 100 may include data stores associated with a user account or profile. The data stores may reside on server 190, on the mobile device 180, or in another location specified by the user. The data stores may include the screen capture images, content graphs, and one or more combined graphs 140, as well as a screen capture index, and other data stores used to generate annotation data. The data stores may be stored on any non-transitory memory.

The mobile device 180 may be in communication with the server 190 and with other mobile devices over network 160. Network 160 may be, for example, the Internet, or the network 160 can be a wired or wireless local area network (LAN), wide area network (WAN), etc., implemented using, for example, gateway devices, bridges, switches, and/or so forth. Network 160 may also represent a cellular communications network. Via the network 160, the server 190 may communicate with and transmit data to/from mobile device 18, and mobile device 180 may communicate with other mobile devices (not shown).

The document reconstruction system 100 represents one example configuration and implementations may incorporate other configurations. For example, some implementations may combine one or more of the components of the document reconstruction engine 192 into a single module or engine, one or more of the components of the document reconstruction engine 130 may be performed by the mobile device 180, for example as document reconstruction engine 130. As another example one or more of the data stores, such as combined graph 140, content graphs, or a screen capture index may be combined into a single data store or may distributed across multiple computing devices, or may be stored at the mobile device 180.

To the extent that the document reconstruction system 100 collects and stores user-specific data or may make use of personal information, the users may be provided with an opportunity to control whether programs or features collect the user information (e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a document reconstruction system.

FIG. 2 illustrates a source document and multiple images of the source document, in accordance with the disclosed subject matter. The source document 200 may represent a physical document (e.g., a magazine), or may represent content displayed on the screen of a mobile device. For example, source document 200 may represent a news article the user of a mobile device is reading online, or may represent an e-mail newsletter being read by the user, or any other content appearing on the display. In the example of FIG. 2, the source document 200 is too large to be displayed on the screen of the mobile device and the user may need to navigate to view the entire contents. In one example, the user may first look at the portion of the document 200 shown in image 205 and scroll to the left to view the portion of the document 200 shown in image 210. As the user is viewing the source document, a content agent, such as content agent 120, may capture the contents of the screen in a screen capture image. In the example of FIG. 2, the content agent 120 may capture image 205, image 210, and image 215 as the user scrolls left. Of course it is understood that the user may scroll in any direction, and the entire contents of the source document 200 may be eventually captured during the session. In another example, the user may be taking pictures of a hard-copy magazine, and take image 205, 210, and 215. Of course, to scan the entire source document 200, the user would continue taking pictures of various portions of the document 200. It is also understood that the user need not take pictures in any particular order to scan source document 200, so long as the session includes images capturing the entire contents of source document 200.

Figure 3:
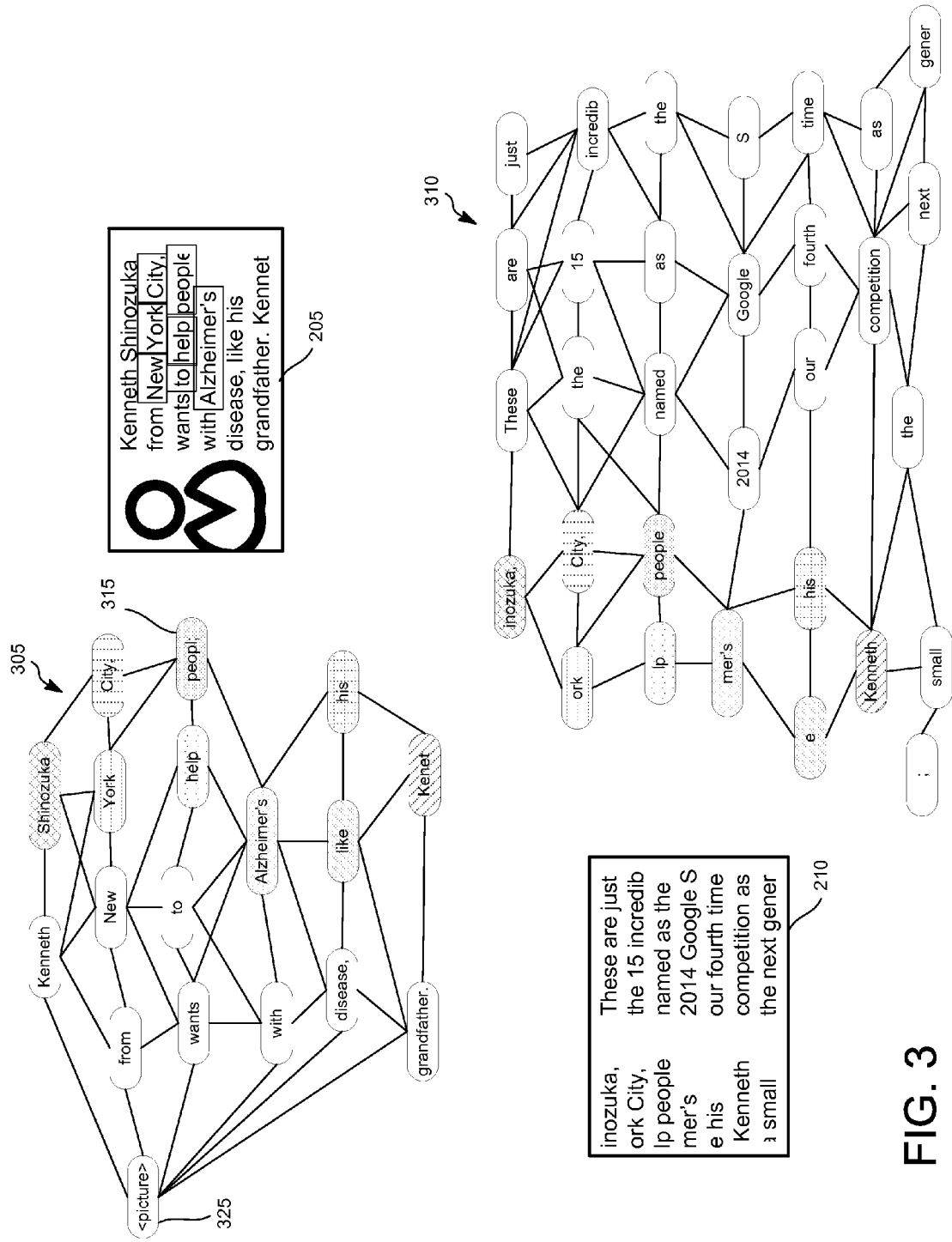
FIG. 3 illustrates example content graphs generated from two of the images of the source document of FIG. 2, in accordance with the disclosed subject matter.

FIG. 3 illustrates example content graphs generated from two of the images of the source document of FIG. 2, in accordance with the disclosed subject matter. For the sake of brevity, only two images 205 and 210 are illustrated, but it is understood that the system may generate a content graph for each image in a session. As illustrated in FIG. 3, the content graph 305 includes nodes that represent white-space delimited strings recognized in the image 205. In addition, the content graph 305 includes a feature point node for a feature point, specifically the picture node 325, that corresponds to the picture of a person in image 205. It is also understood that the nodes in the content graph 305 need not represent whole words. For example, node 315 represents the string "peopl;". This may be the string of characters that the recognition process recognizes in the image 205 because the full word people is cut off or split. Similarly, the content graph 310 for image 210 includes node 320, which is associated with the word "ork," which is also split.

As illustrated by FIG. 3, the content graphs 305 and 310 connect nodes by edges. The edges represent a relative relationship between the two words represented by the two nodes. In the example of FIG. 3, the content graph has an edge when the bounding box of two words in the image are adjacent to each other. For example, word bounding boxes are illustrated in image 205, and the bounding box for help is adjacent to the bounding boxes for New, York, to, peopl; and Alzheimer's but not adjacent to the bounding box for City. Thus, the node for the word help in content graph 305 is connected to the nodes for New, York, to, peopl; and Alzheimer's but not to the node for City. It is understood, however, that a content graph could be generated where each node is connected to each other node. In addition, a content graph may be generated with fewer edges, for example linking the help node with the York, to, peopl; and Alzheimer's nodes but not the New node because the word New is not directly above the word help in the image. The relative position may be determined by bounding boxes, but may also be determined by other methods, such as character recognition order. For example, each node may have an indication of where in the character recognition the word occurs (e.g., first line, 10th word) and relative position may be determined based on line relationships and order within the line. In some implementations, the system may store the content graph for an image with the image until the image becomes too old to be included in a session. For example, if a content agent uses a rolling window of images, a content graph generated for an image may be stored until the image becomes too old to be included in the rolling window. In some implementations, the content graph may be stored until the image itself expires.

Figure 4:
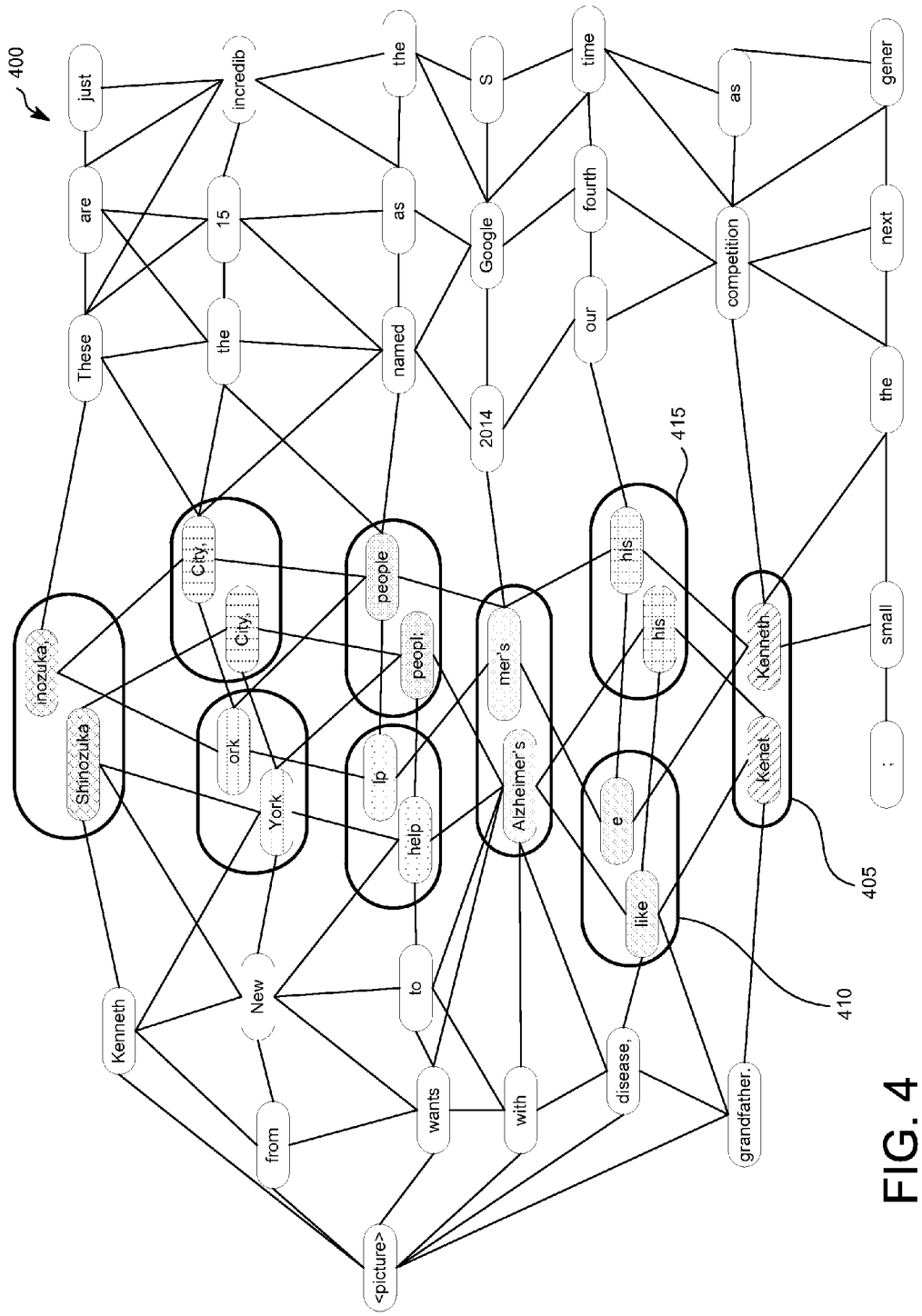
FIG. 4 illustrates an example combined graph generated from the content graphs illustrated in FIG. 3, in accordance with the disclosed subject matter.

FIG. 4 illustrates an example combined graph 400 generated from the content graphs illustrated in FIG. 3, in accordance with the disclosed subject matter. The combined graph 400 may be an example of combined graph 140 of FIG. 1. The combined graph may stitch together the two content graphs by using graph isomorphism techniques. One graph isomorphism technique is to clustering similar nodes. For example, the system may cluster the content nodes in the content graphs based on a similarity metric. The similarity metric may be similarity of string or label, similarity of edges, similarity of neighborhood, etc. In the combined graph 400 most content nodes are in a cluster having a single node—which means that a similar content node was not located in the other graph. However, the combined graph 400 includes nine clusters with two content nodes. It is understood that the combined graph 400 combines only two content graphs for sake of brevity, but that a combined graph 400 may include many more content graphs so that a cluster may have tens of nodes. It is also understood that more overlap in the images of the session and, therefore more overlap in the content graphs, tends to result in more content nodes in a cluster, which reduces recognition noise in the reconstructed document, as explained herein.

The system may select a label for each cluster. The label of the cluster is the word used to represent the cluster in the combined graph, for example when the combined graph is traversed. The system may select the best word for the label from amongst the content nodes that are in the cluster. The best word may be selected in a variety of manners. For example, the best word may be the word that a majority of the nodes in the cluster agree on. For example, both nodes in cluster 415 of combined graph 400 agree on the word his. Thus, the system may choose the label his for the cluster 415. If a majority of nodes do not agree on a word, the system may compute edit distances between the words in the cluster, generating a weighted (by edit distance) undirected complete graph, or cluster edit graph. An edit distance is a quantification of how different two string are, commonly represented by the quantity of operations needed to transform or convert the first string to the second string. A complete graph has an edge between each node. Thus, the system may compute the edit distance between every pair of nodes in the cluster. The system may select the node in the center of the cluster edit graph as the best word or the label for the cluster. When a cluster includes many nodes, correctly spelled words tend to be in the center and words that are split tend to be outliers. In some implementations, the system may generate the cluster edit graph for every cluster and may not determine if a majority of nodes agree on a word. Of course, the system may use other methods of picking the label for the cluster, such as selecting a word with the highest recognition confidence level. This may work well when the cluster does not include many nodes. The system may also select a best word when the other words appear to be a subset of the word, such as in cluster 410 of combined graph 400.

Figure 5:
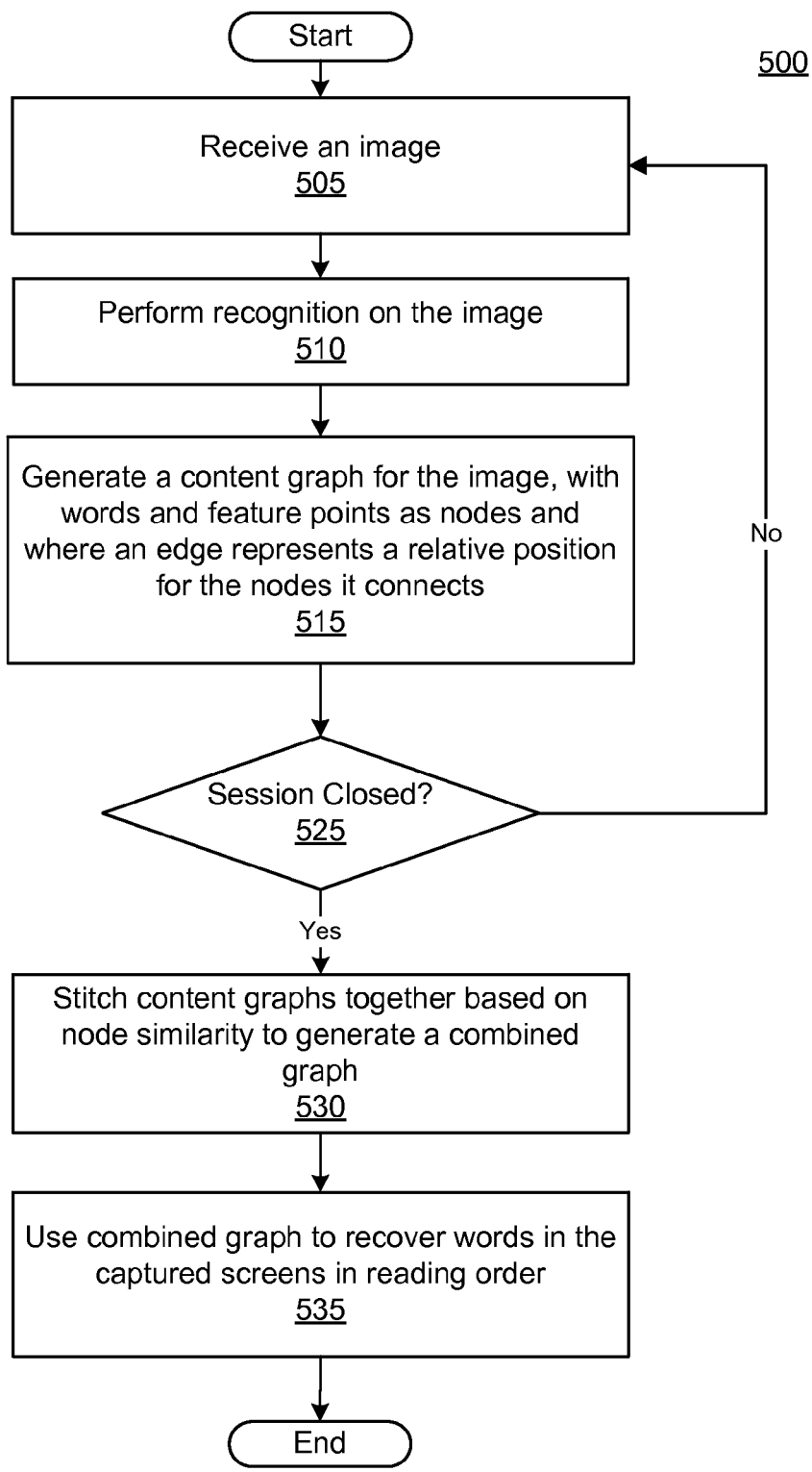
FIG. 5 illustrates a flow diagram of an example process for identifying and ranking entities displayed on a mobile computing device, in accordance with disclosed implementations.

FIG. 5 illustrates a flow diagram of an example process 500 for identifying and ranking entities displayed on a mobile computing device, in accordance with disclosed implementations. Process 500 may be performed by a document reconstruction system, such as system 100 of FIG. 1. Process 500 may be used to reconstruct a document in reading order from multiple images of the document in a common session. Process 500 may begin by receiving an image (505). The image may be a screen capture image of content displayed on a mobile device, for example by a content agent. The content may be generated by a mobile application or may be image data captured from a camera, e.g., as a preview of what the camera is seeing or as an image actually acquired via the camera (or a scanner) associated with the mobile device. The system may perform recognition on the image (510). Performing recognition may cause the system to recognize items, such as text characters or numbers, landmarks, logos, etc. located using various recognition techniques, including character recognition, image recognition, logo recognition, etc. Thus, recognized items may include space-delimited strings of text words as well as locations, landmarks, logos, etc.

The system may generate a content graph for the image (515). The content graph may include space-delimited strings, e.g. words, as nodes. In some implementations, if a recognition confidence level for a string does not meet a threshold the system may not include a node for that string. An edge in the content graph represents a relative position for the two words corresponding with the nodes the edge connects. The relative position may be an indication of direction. For example, in some implementations, the relative position may indicate "to the right, "to the left", "above" or "below." In some implementations, for a particular node the graph may include edges that connect the particular node to any other node that is associated with a word in the line above, the line below, to the left, or to the right of the word associated with the particular node. In some implementations, the relative position may indicate immediately above, above and to the right, etc. The relative position can be represented by numbers or by labels. In some implementations, the relative position may be determined using the center of a bounding box for the two words, such as the bounding boxes illustrated for image 205 in FIG. 3.

In some implementations, the content graph may also include feature points as nodes. Feature points include any distinctive area of an image that stands apart from the surrounding elements of the image. Examples of feature points include images, logos, people, etc. Feature points may or may not include text themselves, such as a person wearing a t-shirt with a slogan or a word logo. Feature point nodes may also be connected to other nodes, whether feature point or word nodes, via one or more edges.

Each node in the content graph may also include attributes or metadata. Such metadata may assist in matching a node in one content graph with a node in another content graph or in traversing the graph in reading order. For example, metadata may include the bounding boxes the node is enclosed by, where in the original image the word (or feature point) occurs, etc. The system may store the content graph for the image in memory, and may associate the content graph with the image.

The system may determine whether a session is closed (525). A session represents a time period that can be defined by a user, defined by a content agent, defined by a quantity of images, defined by an elapsed period of time, or a combination of these. For example, a user scanning a document may expressly start and stop a session. If the user stops the session, the system determines the session is closed. If a predetermined time elapses before the user stops the session, the system may also determine the session is closed. As another example, a content agent may consider a time period, such as five seconds, to be a session. When the time period has elapsed, the system may determine that the session is closed. As another example, the content agent may consider a quantity of captured images to be a session, and when the quantity of screen capture images are collected, the system may determine the session is closed. As another example, the content agent may consider an image associated with annotation data and a most recent current screen capture image to be a session. If the session is not closed (525, No), the system may continue receiving images, performing recognition on the images, and generating content graphs until the session closes. In some implementations, the session may be tied to a particular mobile application. For example, if the user switches from a first mobile application to a second mobile application, the system may determine the session is closed when it receives a new screen capture image associated with the second mobile application. A session may also be expressly closed, or closed early, in other situations. For example, the system may use the content graphs to determine that a next image includes content too different from the previous image. This may occur, for example, when a user is using the mobile device to read a book and the user turns the page. It may also occur, for example, if the user scrolls too quickly. Such events may cause the system to terminate the current session and start a new session.

If the session is closed (525, Yes), the system may stitch together the content graphs generated for the images in the session to generate a combined graph (530). The system may accomplish the stitching based on node similarity between the content graphs. For example, in some implementations, the system may cluster the nodes of the content graphs by similarity measures. Such similarity measures may include, but are not limited to, word similarity, neighborhood similarity, and edge similarity. The system may also use recognition confidence levels to cluster the nodes. A cluster includes at least one node from one content graph and may contain up to one node from each content graph for images in the session. One example of stitching the content graphs together is discussed in more detail below with regard to FIG. 6. In some implementations, the system may not wait for a session to close before stitching together content graphs. For example, the system may begin stitching together graphs using a subset of graphs in the session, in other words forming the combined graph incrementally. The incremental combined graph can provide results that can help inform the end of the session. This may be helpful for providing partial answers when a session length is unknown, or in determining if a session should be terminated early. For example, if the nodes of a content graph for an image do not overlap with the combined graph (e.g., the change is too large), the system may close the session and begin a new session.

Once the system has combined the content graphs, the system can use the combined graph for various purposes, such as recovering the words recognized in the source document in reading order (535). This may be accomplished by traversing the combined graph. For example, in a left-to-right language, the system may begin with a node in the upper left, top line. This may be determined by the relationships, for example nothing above and nothing to the left. In some implementations, the system may use bounding boxes to recover the text. For example, some bounding boxes may represent a first column of text, and a second bounding box may represent a paragraph within the column. The system may use these attributes to determine how to traverse the graph in the correct order.

Figure 6:
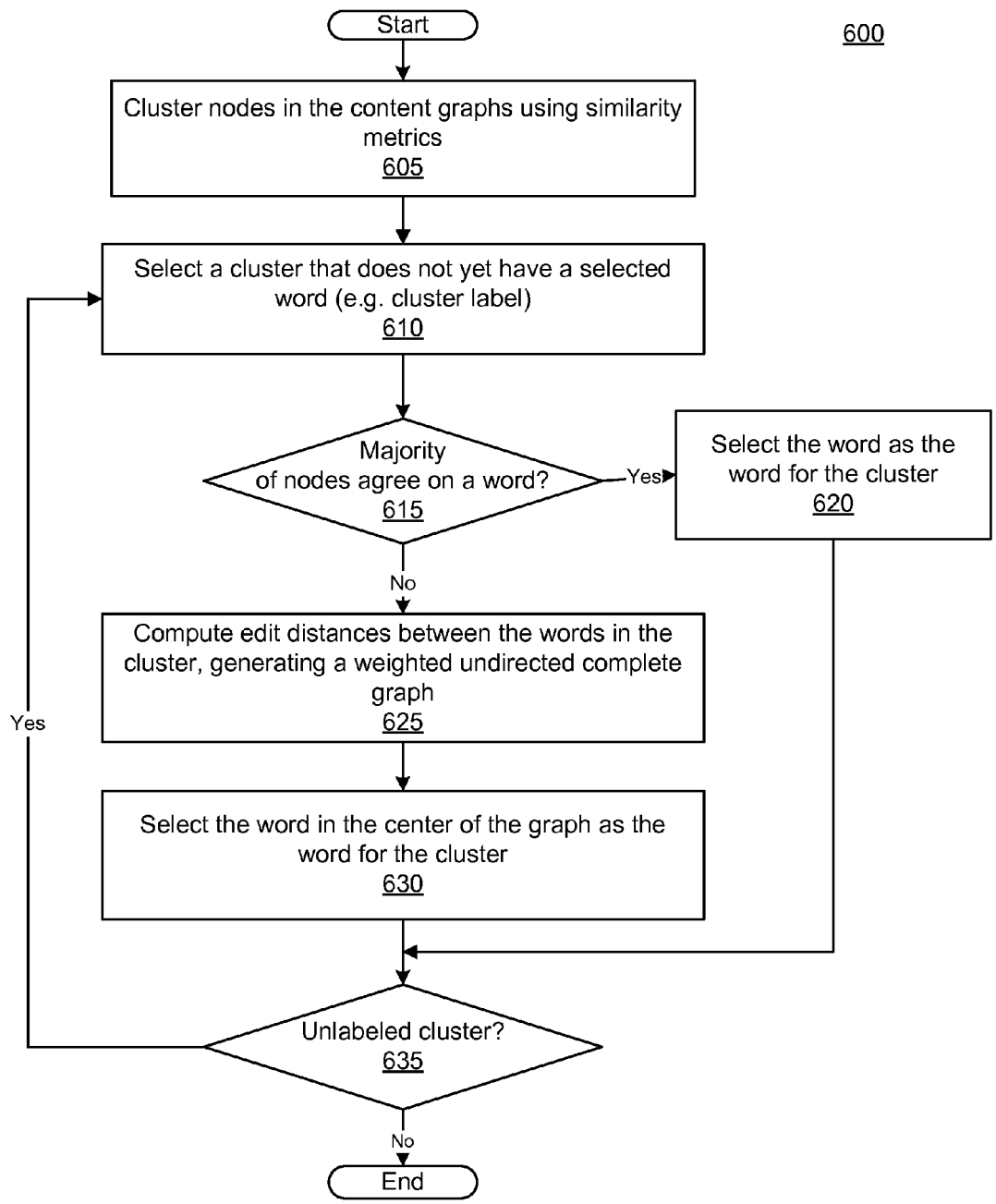
FIG. 6 illustrates a flow diagram of an example process for generating a combined graph, in accordance with disclosed implementations.

FIG. 6 illustrates a flow diagram of an example process 600 for generating a combined graph, in accordance with disclosed implementations. Process 600 may be performed by a mobile content context system, such as system 100 of FIG. 1. The system may perform process 600 as part of step 530 of process 500 to combine or stitch together content graphs for images that are in a session. Process 600 results in a combined graph that can be used as input to a variety of processes. For example, the combined graph may be used to reconstruct the underlying source document in reading order. This may be useful, for example, in providing context for entity disambiguation for entities identified in one of the images in the session or for transforming a the source document into electronically editable text. The combined graph may also be used to reduce recognition noise to determine what text is actually in the source document.

Process 600 may begin by clustering the nodes in the content graph (605). The nodes may represent words (e.g., space-delimited strings) or may represent feature points. The clustering may be based on one or more of node similarity (e.g., word similarity), edge similarity, neighborhood similarity, etc. After clusters are formed, the system may choose a label for each cluster (610). The label is an attribute of the cluster and represents the best estimate of the text that actually appears in the underlying source document. Thus, the label of cluster is similar to a word for a content node. In some implementations, the system may determine whether a majority of nodes agree on a label for the cluster (615). If a majority of the content nodes in a cluster agree (615, Yes), the system may select the word that the majority of content nodes agree upon as the label for the cluster (620). Thus, each node in the cluster may vote for the label. For example, if the cluster includes nodes from five different content graphs, if four of the nodes agree on the label and one node does not, the system may select the label that the four nodes agree on as the best word. While the one node is not eliminated from the cluster, the system does not use its label, as this likely represents a recognition error.

If a majority of nodes do not agree (615, No), the system may generate a cluster edit graph for the cluster (625). The cluster edit graph is a complete weighted graph, where the edges represent the edit distance between the words. The edit distance is a measure of how similar two words are and can be expressed by the number of operations performed to transform the first word into the second word. Thus, the cluster edit graph represents how similar the words represented by the nodes in the cluster are. The system may select a word in the center of the cluster edit graph as the best word or label for the cluster (630). The word in the center is generally equidistant to the remaining nodes. Correctly spelled words tend to fall in the center of the cluster edit graph, which misspellings and split words tend to be outliers. In some implementations, steps 615 and 620 may not be performed and the system may compute the cluster edit graph for every cluster.

Of course, the system may use other methods of selecting a label if a majority of nodes do not agree on the label. For example, the system may use the confidence level and select the node that had the higher confidence level score. As another example, the system may select a node that represents a valid word over a node that does not. As another example, the system may select a node that corresponds with an entity in a graph based data store over one that does not. Other conventional methods of selecting a best node from the cluster may be used.

Once a label has been selected for the cluster, the system may repeat label selection (635, Yes) for another cluster until all clusters with content nodes have a label (635, No). Process 600 then ends. If feature points are included in the content graphs, some clusters may be a cluster of feature points. A label may be chosen for the feature point cluster in a similar manner, as a feature point node in a content graph may also have a label. If boundary box nodes are included in the content graph, such nodes may also be clustered.

FIG. 7 shows an example of a generic computer device 700, which may be operated as system 100, and/or client 170 of FIG. 1, which may be used with the techniques described here. Computing device 700 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a computing device, such as a laptop computer 732, personal computer 734, or tablet/smart phone 736. An entire system may be made up of multiple computing devices 700 communicating with each other. Other configurations are possible.

FIG. 8 shows an example of a generic computer device 800, which may be system 100 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800. Some of the computing devices may be located geographically close to each other, and others may be located geographically distant. The layout of system 800 is an example only and the system may take on other layouts or configurations.

According to certain aspects of the disclosure, a mobile device includes at least one processor and memory storing instructions that, when executed by the at least one processor, cause the mobile device to perform operations. The operations can include, for a plurality of images associated with a session, performing recognition on the image to identify space-delimited strings and generating a content graph for the image, the content graph having content nodes that represent at least some of the strings, an edge in the graph representing a relative position of the content nodes the edge connects. The operations may also include generating a combined graph from the plurality of content graphs based on similarity of content nodes between content graphs, wherein the combined graph represents text from the plurality of images in reading order.

These and other aspects can include one or more of the following features. For example, the operations may also include disambiguating entities identified in one of the plurality of images based on the combined graph. As another example, generating the combined graph can include clustering content nodes between the content graphs based on similarity metrics, wherein a cluster represents a node in the combined graph. In some implementations, generating the combined graph can include selecting a best string from the cluster as a label for the node in the combined graph, wherein selecting the best string reduces noise introduced by the recognition. As another example, the recognition may include feature point recognition and at least one content graph further includes a feature point as a feature point node, wherein node similarity is also based on relative position with the feature point node. As another example, node similarity can be based on similarity of the strings, similarity of a bounding box associated with the strings, and similarity of edge connections.

As another example, the operations may also include determining an image shift between a first image of the plurality of images and a second image of the plurality of images by determining that a first content node in the content graph for the first image is in a cluster with a second content node in the content graph for the second image and calculating the image shift using coordinates associated with the first content node and the second content node. As another example, the session can be defined by a user of the mobile device an/or the session is defined by a fixed time period and the plurality of images represent screens captured from the mobile device during the fixed time period. As another example, the relative position between a first content node and a second content node is based on relative position between a bounding box for the first node and a bounding box for the second node.

According to certain aspects of the disclosure, a method includes receiving an image from a mobile device, performing recognition on the image to identify space-delimited strings, and generating a content graph for the image, the content graph having content nodes that represent at least some of the strings and the content graph having edges that represent a relative position of strings associated with the content nodes connect by the edges. The method may also include repeating the receiving, performing recognition, and generating for a plurality of images, the plurality of images belonging to a session, and generating a combined graph from the plurality of content graphs based on similarity of content nodes between content graphs, the combined graph representing text from the plurality of images in reading order.

These and other aspects can include one or more of the following features. For example, the plurality of images can represent portions of a source document and the combined graph represents a reconstruction of the source document. As another example, the plurality of images can represent portions of a source document and at least two consecutively received images of the plurality of images lack overlapping portions. As another example, the recognition can include feature point recognition and at least one content graph can further include a feature point as a feature point node, wherein node similarity is also based on relative position with the feature point node. As another example, the session may close when a received image is associated with a first mobile application and the preceding received image is associated with a second mobile application that differs from the first mobile application. As another example, generating the content graph can include determining that a confidence level for a first identified string meets a threshold and generating a content node for the first identified string responsive to the determining. As another example, the recognition includes feature point recognition and the content graph further includes a recognized feature point as a feature point node. As another example, at least some of the content nodes are associated with a paragraph bounding box.

According to certain aspects of the invention, a system includes at least one processor and memory storing instructions that, when executed by the at least one processor, cause the system to perform operations. The operations may include, for each of a plurality of images associated with a session: performing recognition on the image to identify space-delimited strings and generating a content graph for the image, the content graph having content nodes that represent at least some of the strings, wherein an edge in the graph represents a relative position of the content nodes the edge connects. The operations may also include generating a combined graph from the plurality of content graphs by clustering the content nodes and disambiguating an entity mention in one of the plurality of images based on context derived from the combined graph. In some implementations, the operations may also include, for a cluster, selecting a content node from the cluster as a label for the cluster, wherein the cluster label is used as context for disambiguating the entity.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
at least one processor; and
memory storing instructions that, when executed by the at least one processor, cause the mobile device to:
for a plurality of images associated with a session:
perform recognition on the image to identify space-delimited strings, and
generate a content graph for the image, the content graph having content nodes that represent at least some of the strings, an edge in the graph representing a relative position of the content nodes the edge connects;
generate a combined graph from the plurality of content graphs by clustering content nodes between the content graphs based on similarity metrics, wherein a cluster represents a node in the combined graph; and
select a best string from the cluster as a label for the node in the combined graph, wherein the combined graph represents text from the plurality of images in reading order.

2. The mobile device of claim 1, wherein the memory further stores instructions that, when executed by the at least one processor, causes the mobile device to:
disambiguate entities identified in one of the plurality of images based on the combined graph.

3. The mobile device of claim 1, wherein the similarity metrics include word similarity, neighborhood similarity, and edge similarity.

4. The mobile device of claim 1, wherein selecting the best string reduces noise introduced by the recognition.

5. The mobile device of claim 1 wherein the recognition includes feature point recognition and at least one content graph further includes a feature point as a feature point node, wherein node similarity is also based on relative position with the feature point node.

6. The mobile device of claim 1, wherein node similarity is based on similarity of the strings, similarity of a bounding box associated with the strings, and similarity of edge connections.

7. The mobile device of claim 1, wherein the memory further stores instructions that, when executed by the at least one processor, causes the mobile device to determine an image shift between a first image of the plurality of images and a second image of the plurality of images by:

determining that a first content node in the content graph for the first image is in a cluster with a second content node in the content graph for the second image; and
calculating the image shift using coordinates associated with the first content node and the second content node.

8. The mobile device of claim 1, wherein the session is defined by a user of the mobile device.

9. The mobile device of claim 1, wherein the session is defined by a fixed time period and the plurality of images represent screens captured from the mobile device during the fixed time period.

10. The mobile device of claim 1, wherein the relative position between a first content node and a second content node is based on relative position between a bounding box for the first node and a bounding box for the second node.

11. A method comprising:
receiving an image from a mobile device;
performing recognition on the image to identify space-delimited strings;
generating a content graph for the image, the content graph having content nodes that represent at least some of the strings and the content graph having edges that represent a relative position of strings associated with the content nodes connected by the edges;
repeating the receiving, performing recognition, and generating for a plurality of images, the plurality of images belonging to a session;
generating a combined graph from the plurality of content graphs by clustering content nodes between the content graphs based on similarity metrics, wherein a cluster represents a node in the combined graph; and
selecting a best string from the cluster as a label for the node in the combined graph, the combined graph representing text from the plurality of images in reading order.

12. The method of claim 11, wherein the plurality of images represents portions of a source document and the combined graph represents a reconstruction of the source document.

13. The method of claim 11, wherein the plurality of images represent portions of a source document and at least two consecutively received images of the plurality of images lack overlapping portions.

14. The method of claim 11, wherein the recognition includes feature point recognition and at least one content graph further includes a feature point as a feature point node, wherein node similarity is also based on relative position with the feature point node.

15. The method of claim 11, wherein the session closes when a received image is associated with a first mobile application and the preceding received image is associated with a second mobile application that differs from the first mobile application.

16. The method of claim 11, wherein generating the content graph includes:
determining that a confidence level for a first identified string meets a threshold; and
generating a content node for the first identified string responsive to the determining.

17. The method of claim 11, wherein the recognition includes feature point recognition and the content graph further includes a recognized feature point as a feature point node.

18. The method of claim 11, wherein at least some of the content nodes are associated with a paragraph bounding box.

19. A system comprising:
  at least one processor; and
  memory storing instructions that, when executed by the at least one processor, cause the system to:
    for each of a plurality of images associated with a session:
      perform recognition on the image to identify space-delimited strings, and
      generate a content graph for the image, the content graph having content nodes that represent at least some of the strings, wherein an edge in the graph represents a relative position of the content nodes the edge connects,
    generate a combined graph from the plurality of content graphs by clustering the content nodes based on similarity metrics, wherein a cluster represents a node in the combined graph,
    select a best string from the cluster as a label for the node in the combined graph, and
    disambiguate an entity mention in one of the plurality of images based on context derived from the combined graph.

20. The system of claim 19, wherein the label is used as context for disambiguating the entity.

* * * * *